Oct. 14, 1958  O. R. SCHOENROCK  2,856,210
OIL SEAL
Filed June 30, 1955  2 Sheets-Sheet 1
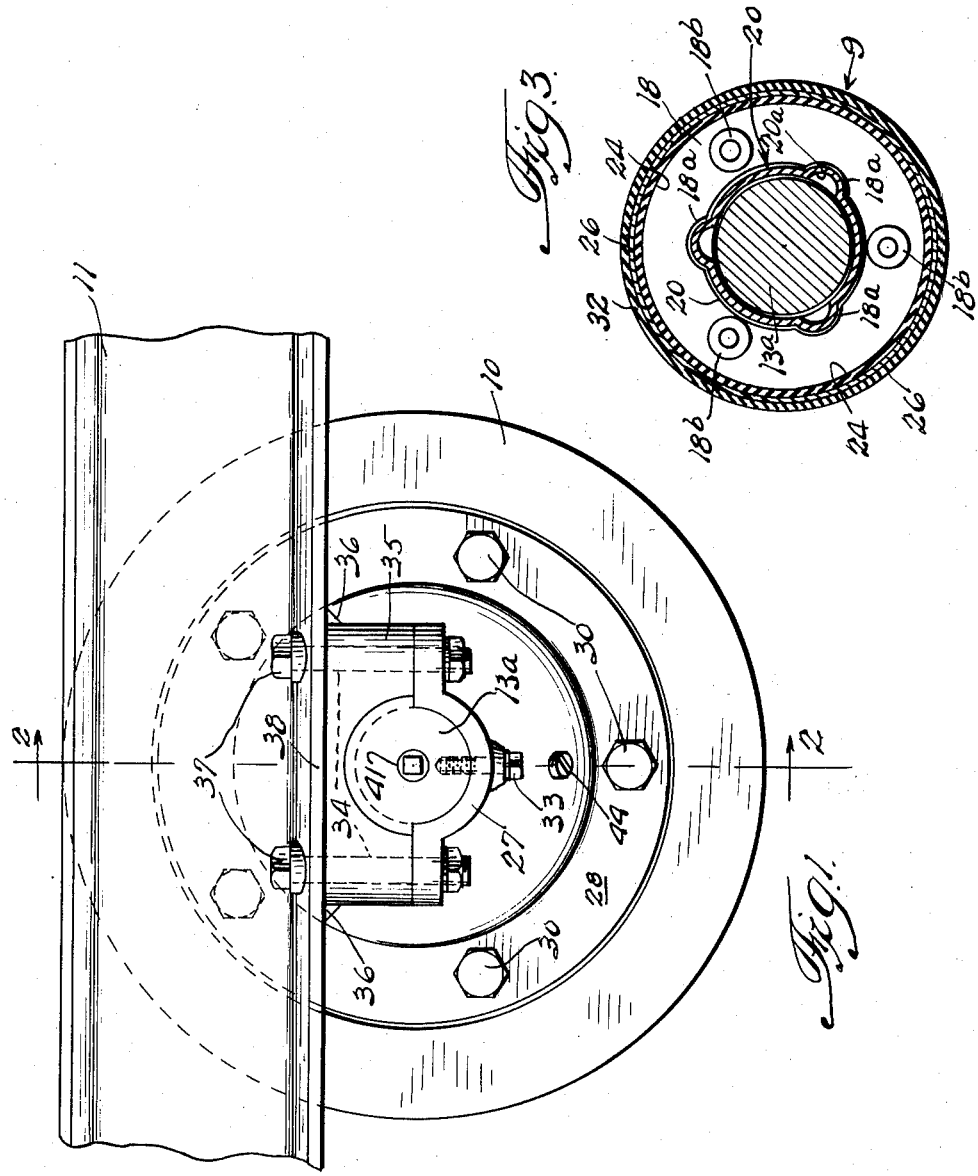
INVENTOR.
Otto R. Schoenrock.

Oct. 14, 1958 O. R. SCHOENROCK 2,856,210
OIL SEAL
Filed June 30, 1955 2 Sheets-Sheet 2
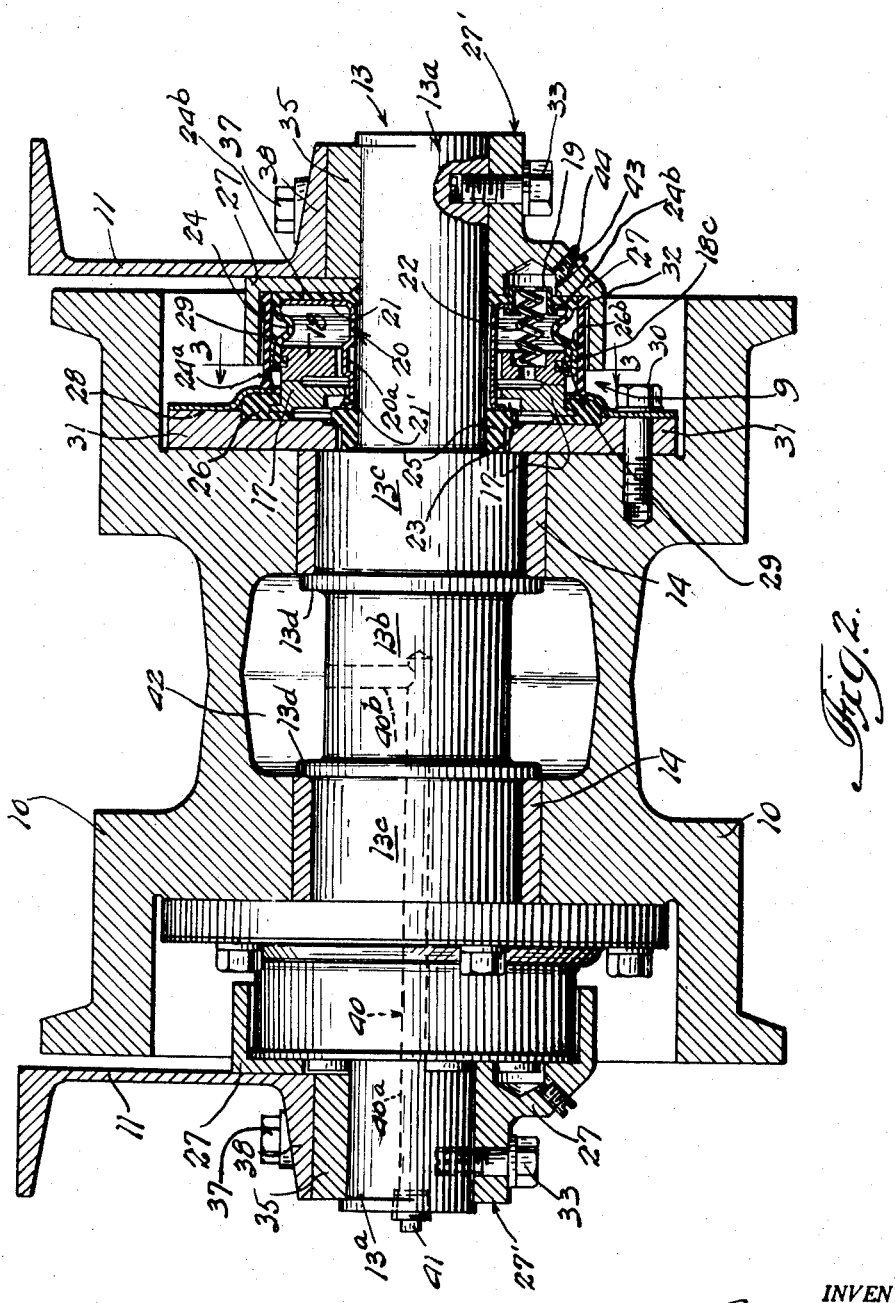
INVENTOR.
Otto R. Schoenrock
BY

United States Patent Office 2,856,210
Patented Oct. 14, 1958

2,856,210

OIL SEAL

Otto R. Schoenrock, Oak Park, Ill.

Application June 30, 1955, Serial No. 519,158

1 Claim. (Cl. 286—11)

This invention relates to oil seal bearings having two annular sealing elements pressed endwise into sealing engagement.

Among the objects of my invention are to provide such a seal which may be combined with or substituted for oil seals of the general type shown in my Patent No. 2,736,624, dated February 28, 1956, and in the patent to Land No. 2,414,600, dated January 21, 1947.

A further object of my invention is to provide an improved oil seal which will comprise a plurality of coaxial oil seal elements to provide sealing engagement in series with each other.

A further object is to provide an oil seal having a plurality of coaxial oil seal elements including two sealing rings in endwise sealing engagement, a sleeve surrounding one of said coaxial elements and extending through said rings and having an outwardly extending flange adjacent one end, and means for hindering the flow of oil or foreign material with respect to said sealing rings comprising a sleeve surrounding said annular flexible sealing means in sealing relation with respect to both said sealing means.

A further object is to provide an improved oil seal including two sealing rings in endwise sealing engagement, a collar of annular, flexible, stretchable, resilient material such as rubber secured to the outer edge of the ring which is held against rotation for hindering the flow of oil or foreign material with respect to said sealing ring, and a collar of flexible, stretchable, resilient, leak-stop material embracing and surrounding the outer edge of the ring.

A further object is to provide an improved oil seal including two sealing rings in endwise sealing engagement, a collar of flexible, stretchable, resilient sealing material such as rubber closely surrounding and adjacent said fixed coaxial member.

Further and additional objects will become manifest from a consideration of this specification, the accompanying drawings and the appended claim.

In the drawings in which an embodiment of my invention is shown:

Fig. 1 is in general an end view as seen from the right of Fig. 2;

Fig. 2 is an axial vertical cross section of a bearing and oil seal substantially on the line 2—2 of Fig. 1; and Fig. 3 is a section on the line 3—3 of Fig. 2.

Referring now to the drawings, and more particularly to Fig. 2, the improved oil seal unit 9 is shown as forming a part of a crawler-type tractor shown and described in the above-identified patent to Land. The tractor in this instance is shown as comprising a track roller 10, a pair of frame members 11 arranged in spaced parallel relation with respect to one another, and a nonrotating shaft 13 supported by the frame members and disposed transversely with respect thereto. The shaft 13 is provided with end portions 13a of reduced cross section, a center portion 13b of reduced cross section, and intermediate boss portions 13c, each of the latter being provided with an annular flange portion 13d adjacent center portion 13b. Encompassing each boss portion 13c is a bearing bushing 14 which is fixedly secured to the roller 10 and is adapted to rotate therewith.

An oil seal assembly 9 is provided for each reduced end portion 13a of the shaft 13. Each oil seal assembly comprises a pair of ring-like sealing elements 17 and 18 which are arranged in coaxial relation with respect to one another and are adapted to abut one another when the unit is assembled. The abutting face of each element is properly finished to form a planar surface thereby resulting in an effective seal between the faces. Element 17, in this instance, is adapted to rotate with the roller 10, and element 18, on the other hand, is adapted to remain in a fixed position with respect to the shaft 13.

An elongated sleeve-like member 20 is provided which is adapted to encompass a part of shaft portion 13a and extend through central openings formed in elements 17 and 18. The end of the sleeve 20 adjacent the frame member 11 terminates in an outwardly extending apertured flange 21. The other end of the sleeve 20, on the other hand, terminates in a relatively small outwardly extending flange 21' and is adapted to prevent endwise removal of element 17 from sleeve 20 once it has been assembled thereon. The sleeve 20 is provided intermediate the end flanges thereof with a plurality of symmetrically arranged, radially extending bosses 20a which are adapted to register with peripheral recesses 18a formed in the center opening of element 18, see Fig. 3, and thereby prevent rotation of said sleeve with respect to element 18 in a manner to be more fully described hereinafter. In addition, element 18 is provided with a peripheral groove 18c for a purpose to be described more fully hereinafter. The small flange 21' positioned at the inner end of sleeve 20 is formed subsequent to the elements being positioned thereon. Element 18 has the outer surface thereof, that is, the surface opposite element 17, provided with a plurality of symmetrically arranged pockets 18b which are adapted to accommodate the corresponding ends of a plurality of coil springs 22 which are disposed intermediate element 18 and flange 21 of sleeve 20 and are adapted to exert pressure on element 18 and effect abutting relation of the latter with element 17. The other or outer ends of the springs 22 are accommodated by cups 19 which are seated within symmetrically arranged apertures formed in flange 21 of sleeve 20, see Fig. 2.

Element 17 is provided on its inner side, that is, the side opposite element 18, with a plurality of radial outwardly extending fingers which are adapted to be accommodated by corresponding recesses formed in a collar 26, the latter being fabricated of rubber or any other suitable resilient material. The inner side of collar 26 is positioned within a countersunk opening in a washer piece 31 and is held in place therein by retaining piece 28. Pieces 28 and 31 are secured to roller 10 by a plurality of anchoring bolts 30, see Figs. 1 and 2. Thus, friction between collar 26 and pieces 28 and 31 causes collar 26 to rotate with roller 10.

Element 18, as heretofore mentioned, is provided with an annular groove 18c which is adapted to accommodate an inwardly extending lip 24a of a bellows type member 24. The member 24 is formed of rubber or any other suitable resilient material, and is held in position within the groove of element 18 by a clamping ring 29. The member 24 spans the distance between element 18 and flange 21 of sleeve 20 and has the outer end of the bellows member 24 terminating in an inwardly extending flange 24b which is provided with a plurality of openings for accommodating the pockets 19 heretofore described. The flange 24b is disposed on the outside of sleeve flange 21 and between said flange and a holding cap 27 which forms a part of a bearing saddle 27' for the end portion 13a of the shaft.

The cap 27 is provided with a plurality of openings 5 which are adapted to accommodate the spring cups 19. The saddle 27' cooperates with and is secured by bolts 37 to an upper semicylindrical saddle portion 35 which is adapted to partially encompass the upper peripheral portion of the shaft end portion 13a when the tractor is assembled. Saddle portion 35 is secured to the frame member 11 by welding 36 or any other suitable means.

Encompassing bellows member 24 and retaining ring 29 is a sealing sleeve 32 formed of rubber or any other suitable resilient material. The sleeve 32 is compressed between the outer exposed surface of retaining piece 28 and the inner surface of cap 27, see Fig. 2, and prevents any foreign matter from entering into the area adjacent sealing elements 17 and 18.

The small end flange 21' of sleeve 20 heretofore described, abuts one end of a resilient collar 25 and retains the latter against boss portion 13c of the shaft 13.

Each unit 9 is substantially assembled prior to the unit being positioned on shaft end 13a. Subsequent to the unit being positioned on the shaft, the shaft, the roller carried thereby and the oil seal units adjacent each end of the shaft are moved upwardly into position between the spaced frame members 11, and then the saddle portions at each end of the shaft are bolted together with respect to one another. To insure nonrotation of the shaft with respect to the frame members, a locking bolt 33 is threaded through the protruding saddle portion of cap 27 and into a threaded opening formed in shaft end portion 13a, see Fig. 2. One end of shaft 13 is provided with a passageway 40 which has one segment 40a thereof extending axially a predetermined distance through shaft 13, and a second segment 40b communicating with the inner end of the first segment and terminating at the periphery of shaft portion 13b. Shaft portion 13b, flange portions 13d and a recess formed centrally in roller 10 cooperate with one another to form an oil reservoir 42. The passageway 40 is sealed off by a plug 41 threaded into the exposed end of the passageway. Oil from reservoir 42 is adapted, upon rotation of the roller, to pass from reservoir 42 axially along shaft 13, past bushings 14; from bushings 14 past washer 31 and into the interior of seal unit 9 to effect lubrication of elements 17 and 18. The oil is prevented from escaping from unit 9 by reason of the sleeve 32 and bellows unit 24. To pack the interior of the unit 9 with grease or other suitable lubricant a passageway 43 is formed in a portion of cup 27. The exposed end of the passageway 43 is provided with a removable plug 44.

Thus it will be seen that an oil seal has been provided which is adapted to be readily assembled or disassembled when desired, and effectively prevents foreign material from entering various parts of bearings which might otherwise seriously damage same.

Further modifications will be apparent to those skilled in the art, and it is desired, therefore, that the invention be limited only by the scope of the appended claim.

I claim:

An oil seal bearing construction comprising two coaxial members, one fixed and one rotatable and one surrounding the other, bearing means surrounding one member and surrounded by the other, sealing means for hindering the flow of oil or foreign material with respect to said bearing means comprising two sealing rings coaxial with said bearing means and in endwise sealing engagement with each other, means for holding one of said rings against rotation comprising a sleeve surrounding one of said coaxial members and extending through said rings and having an outwardly extending flange adjacent one end of the sleeve, resilient means acting on said sealing rings for forcing them into sealing engagement with each other, means for securing said rings on said sleeve together as a subassembly in making the complete assembly, recessed collar means interlockingly engaging said rotatable sealing ring, retaining means frictionally engaging said collar means, fastening means securing said retaining means to said bearing rotatable coaxial member, cap means forming a portion of a bearing for said rotatable bearing member, in axial alignment with said recessed collar means, annular flexible sealing means extending between and secured in sealing engagement to the periphery of said flange and one of said sealing rings, resilient collar means compressed at opposed peripheral end limits between said retaining means and said cap means, completely surrounding the periphery of said sealing ring interface whereby said sealing rings are sealed from the exterior of said bearing whereby the flow of oil or foreign material with respect to said sealing rings is hindered.

References Cited in the file of this patent

UNITED STATES PATENTS

| | | |
|---|---|---|
| 2,414,600 | Land | Jan. 21, 1947 |
| 2,639,170 | Schick et al. | May 19, 1953 |
| 2,695,799 | Chambers et al. | Nov. 30, 1954 |
| 2,701,154 | Dolhun | Feb. 1, 1955 |
| 2,728,591 | Solari | Dec. 27, 1955 |